United States Patent [19]

Bosley et al.

[11] 4,025,592

[45] May 24, 1977

[54] ADDITION OF DIETHYLENE GLYCOL IN CONTINUOUS PRODUCTION OF POLYESTER YARN

[75] Inventors: David E. Bosley, Grifton, N.C.; Patrick J. Duncan, Hendersonville, Tenn.

[73] Assignee: E. I. Du Pont de Nemours and Company, Wilmington, Del.

[22] Filed: Aug. 13, 1975

[21] Appl. No.: 604,110

[52] U.S. Cl. .............................. 264/78; 260/75 T; 264/211
[51] Int. Cl.² ........................................... D01F 1/04
[58] Field of Search .......... 260/75 R, 75 T; 264/78, 264/211

[56] References Cited

UNITED STATES PATENTS

| | | | |
|---|---|---|---|
| 2,534,028 | 12/1950 | Izard | 260/75 R |
| 3,051,212 | 8/1962 | Daniels | 152/330 |
| 3,423,370 | 1/1969 | Fitz et al. | 260/75 R |
| 3,496,146 | 2/1970 | Mellichamp | 260/75 R |
| 3,554,976 | 1/1971 | Hull | 260/75 R |
| 3,829,543 | 8/1974 | Robertson | 264/176 F |

*Primary Examiner*—Jay H. Woo

[57] ABSTRACT

Polyester texturing feed yarns are produced by preparing an ethylene terephthalate polymer from ethylene glycol plus a small amount of diethylene glycol, and dimethyl terephthalate or terephthalic acid, and melt-spinning the polymer into filaments. The filaments may be partially oriented by spinning at high speed without cold drawing, or may be fully drawn after conventional spinning. The diethylene glycol is added in controlled amounts to provide uniform dyeability in fabrics prepared from the yarn after texturing.

4 Claims, No Drawings

ADDITION OF DIETHYLENE GLYCOL IN CONTINUOUS PRODUCTION OF POLYESTER YARN

BACKGROUND OF THE INVENTION

This invention relates to the manufacture of synthetic linear condensation polyester feed yarns for texturing processes, and is more particularly concerned with a method of producing feed yarns which will provide more uniform dyeability in products prepared from them.

Processes for preparing polyester yarns from ethylene glycol and dimethyl terephthalate by ester-interchange followed by polymerization, or from ethylene glycol and terephthalic acid by direct esterification followed by polymerization, are well known. A major problem has been to control these processes to provide uniform dyeability in products made from the yarns. Textile mills must be able to put yarns from different yarn packages into adjacent areas of the same fabric and then dye the fabric without obtaining "dye junctions" (color discontinuities) which detract from the appearance of the dyed fabric. In other words, yarns from different packages must be "mergeable". Yarn manufacturers must have developed a system of selling yarns of equivalent dyeability under a given "merge number". When a process change occurs which affects the dyeability, a different merge number is assigned. However, the textile mills have had a constant problem in scheduling the use of packages having different merge numbers and in preventing accidental mixing of packages.

Control dyeability when producing polyester texturing feed yarns is a particularly difficult problem. When the process for producing such yarns includes a separate drawing step, the dyeability can be adjusted somewhat by making adjustments in the draw ratio used. Increasing amounts of partially oriented feed yarns are now being produced by high speed spinning, e.g., as disclosed in Piazza and Reese U.S. Pat. No. 3,772,872. These yarns are draw-textured and no practicable way has been found to control dyeability by making adjustments in the draw-texturing process.

Normally, in the production of polyester textile yarns, an objective has been to avoid the presence of aliphatic ether groups in the polymer because of their undesirable effect on properties of the yarns. Processes have been devised to make possible reduction of ether content to less than 3 mole percent, e.g., as illustrated by Izard U.S. Pat. No. 2,534,028, Mellichamp U.S. Pat. No. 3,496,146 and Armstrong et al. U.S. Pat. No. 3,534,082.

The unexpected discovery has now been made that uniform dyeability can be achieved by controlled addition of diethylene glycol at levels less than about 3 mole % without significant effect on other properties of textile yarns.

SUMMARY OF THE INVENTION

The present invention is an improvement in a continuous process for producing polyester texturing feed yarn from ethylene glycol and dimethyl terephthalate or terephthalic acid in which a polymer of less than 3 mole percent ether content is prepared and melt-spun to form partially-oriented yarn or fully-drawn yarn. The improvement comprises adding diethylene glycol to increase the ether content of the polymer by 0.1 to 2 mole percent.

The invention is particularly useful for correcting changes in dyeability. The dyeability of products prepared from the feed yarn is determined periodically and the amount of diethylene glycol added is adjusted to maintain a substantially uniform dyeability. As little as 0.1 mole percent change in the amount of diethylene glycol added can cause a change of about 1 percent (as defined below) in dyeability.

Preferably, diethylene glycol is added to increase the ether content of the polymer by 0.1 to 2 mole percent and the total ether content of the polymer is maintained between 2 and 4 mole percent. As illustrated in Example 3, operation under these conditions provides a much improved uniformity of dyeability in comparison to operation with no addition of diethylene glycol.

Preferably the total ether content of the polymer is maintained below 3 mole percent. Properties of textured yarn prepared from the feed yarn begin to be adversely affected at values above 3 mole percent although the yarns are generally satisfactory at somewhat higher total ether contents.

DETAILED DESCRIPTION

The deliberate addition of diethylene glycol in the preparation of polyethylene terephthalate is contrary to the normally accepted practice of seeking to prevent the presence of aliphatic ether groups in the polymer. It is surprising that useful degrees of dyeability improvement can be obtained with added diethylene glycol while still maintaining a desirably low ether content. In the present invention, the amount of diethylene glycol added is preferably such that the total ether content of the polymer remains below about 3 mole percent.

In order to determine the amount of diethylene glycol needed in the polymer to adjust dyeability lever, it is necessary to measure the dyeability of the yarn under conditions simulating actual textile finishing conditions. To do this, the yarn is first textured under normal texturing conditions. Any of the standard texturing or draw texturing machines may be used, e.g., a Leesona 553 or an ARCT-480 texturing machine. Temperatures and tensions are adjusted to give satisfactory performance for the particular yarn being tested. After texturing, the yarns are put in a convenient form for test dyeing, such as a skein or a knit sock, and dyed along with a similarly prepared sample of control yarn under standardized dyeing conditions, preferably using a disperse dye which accentuates dyeing differences. After dying, the reflectance of the sample is measured on a colorimeter and K/S factor calculated from the equation $$K/S = (1-R)^2/2R$$

where $R$ is the fractional reflectance measured at the wavelength of the maximum absorbence of the dye used. $K/S$ values are determined for both test and control samples and the percent dyeability of the test sample is calculated from the expression $$(K/S) \text{ test}/(K/S) \text{ control} \times 100 = \text{Percent dyeability}$$

The amount of diethylene glycol needed in the polymer to adjust dyeability to the correct level may then be approximated by using the relationship $$\Delta DEG = 0.1 (A-B)$$

where
 ΔDEG is the mole percent diethylene glycol needed
 A = percent dyeability desired
 B = percent dyeability measured.

In the typical manufacture of polyethylene terephthalate, ethylene glycol is reacted with dimethyl terephthalate or with terephthalate acid. The reaction is usually carried out in stages with the final polymerization stage occurring in a vessel maintained at a temperature of 275°–310° C. and under high vacuum. Excess glycol is removed through the vacuum system along with small quantities of monomer, oligomer and catalyst residues. It will be appreciated, therefore, that a portion of the added diethylene glycol will also be lost through the vacuum system. Since dyeability is a function of the amount of diethylene glycol in the final polymer, the amount of diethylene glycol added to the polymerization system will usually be more than the amount desired in the final polymer to allow for vapor loss. The exact amount lost through the vacuum system will depend upon the specific polymerization apparatus used and for that reason the amount of needed DEG calculated from dyeability tests must be corrected for vapor loss by a factor specific to the polymerization system being used. This factor may be easily determined by analysis of the ether content of polymer made with and without diethylene glycol addition. Once this "loss fraction" is determined, it may be used routinely with only an occasional redetermination, as the loss fraction for a given system remains resonably constant. In standard commercial polymerization equipment, loss fractions are usually of the order of 0.4, i.e., the fraction of added DEG retained in the polymer is usually of the order of 60%.

Diethylene glycol provides aliphatic ether groups in the polymer molecule. The concentration of aliphatic ether groups can be determined by known analytical methods. One convenient method is based upon an analysis of the infrared absorbance of the polymer. A film is pressed from the polymer and an infrared absorbence scan made, and the relationship determined between the peak related to aliphatic CH stretching and the peak related to aromatic CH stretching. Other chemical methods are known. For example, a gas-chromatographic analysis may be used on depolymerized polymer. All such tests may be standardized against samples to which known amounts of diethylene glycol have been added.

In the examples, "relative viscosity" is the ratio of the viscosity of a solution of 0.8 grams of polyester, dissolved in 10 ml. of hexafluoroisopropanol containing 80 ppm $H_2SO_4$, to the viscosity of the $H_2SO_4$-containing hexafluoroisopropanol itself, both measured at 25° C. in a capillary viscometer and expressed in the same units.

Yarn break elongation (E) is measured on an Instron Tensile Tester using a sample length of 5 inches (12.7 cm) and a rate of elongation of 200% per minute.

In the examples, parts and percentages are by weight unless otherwise indicated.

EXAMPLE 1

A three vessel polyester continuous polymerization system is coupled to two spinning machines, one for spinning ordinary fully-drawn texturing feed yarns and the other for spinning draw-texturing feed yarns. Molten dimethylterephthalate and ethylene glycol containing manganese acetate and antimony trioxide are continuously fed to the first vessel where ester interchange is carried out. The catalyst concentrations are sufficient to give 125–135 parts per million Mn and 310–320 parts per million Sb in the polymer. The mole ratio of glycol to DMT is 2.0. To the liquid product of this "ester interchange" vessel is added sufficient phosphoric acid to give 185–190 parts per million phosphoric acid in polymer and a glycol slurry of $TiO_2$ in sufficient quantity to give a concentration of 0.3 weight percent $TiO_2$ in the polymer. The mixture is transferred to the second vessel where the temperature is increased and the pressure reduced as polymerization is initiated. Excess ethylene glycol is removed through the vacuum system. The low molecular weight polymer produced is then transferred to a third vessel (finisher) where the temperature is raised to 285°–290° C. and pressure reduced to about 1 mm. mercury. The polymer produced has a relative viscosity of 22 and an ether content of 1.07 mole percent. A portion of the polymer output is passed to one spinning machine where it is melt spun and drawn to give a 150 denier, 34-filament texturing feed yarn having a break elongation (E) of 31 percent. Another portion of the polymer output is transferred to a second spinning machine where it is melt spun at high speed (without a separate drawing step) to give a 34-filament draw-texturing feed yarn of 245 denier having a break elongation (E) of 131 percent.

Samples of the above-prepared yarns are then checked for dyeability as follows:

The partially-oriented yarn (131 percent E) is draw-textured on an ARCT-480 texturing machine using a spindle speed of 430,000 rpm, draw ratio of 1.58, a twist of 66 tpi, a first heated temperature of 210° C. (410° F.) and a second heater temperature of 230° C. (446° F.). Another similar yarn, chosen to be the reference standard for this test, is also textured in like manner on the same machine. Both test and reference yarns are made into skeins, scoured and dyed (together) at atmospheric pressure using a bath-to-fiber ratio of 191:1. The aqueous dye bath contains 3.6 percent (on wt. of fiber) C.I. disperse blue 60 (Latyl Brilliant Blue BG), 1 gm/liter anionic hydrocarbon sodium sulfonate (Avitone T), 0.75 gm./liter nonionic fatty alcohol ethylene oxide condensate (Merpol HCS), 2 ml/liter 50 percent o-phenylphenol (Carolid), 0.7 gm./liter monosodium phosphate (to give pH 5.5-6.0).

Skeins are introduced into the dye bath at 60° C., the temperature raised to 95° C. at a rate of 1° C./min., and then held at 95° C. for 40 minutes. The skeins are then rinsed, air-dried and examined for dye uptake on a Hunterlab Model D25M Colorimeter. Percent relfectance readings are converted to percent dyeability, assigning a value of 100 percent dyeability to the reference sample. The partially-oriented (131 percent E) test item is found to have a percent dyeability of 99.2.

The fully-drawn test yarn (31 percent E) is textured on a Leesona 553 texturing machine using a spindle speed of 210,000 rpm, a twist of 63 tpi, a heater temperature of 232° C. (450° F.) and a bottom overfeed of 1 percent. A fully-drawn reference yarn, from polymer similar to that of the reference sample used for the partially-oriented yarn, is textured in a similar fashion on the same machine. Test and reference samples are then made into skeins and dyed using the procedure described above. The reflectance of each sample is then measured and the percent dyeability of the test yarn (31 percent E) is calculated to be 98.5.

To illustrate the effect of adding DEG, it is then decided to raise the dyeability level of the texturing feed yarns to about 120 percent of the reference sample. By referring to the relationship $\Delta DEG = 0.1 (A-B)$, it is seen that such an increase could be expected by adding sufficient DEG to the polymerization system to give about 2 mole percent additional DEG in the final polymer. To the polymerization system operating as above, 3.0 weight percent (1.78 mole%) diethylene glycol is added to the feed glycol, this amount being 3.56 mole % DEG based on DMT. Other conditions are held constant. Using the procedure described above, partially-oriented yarn is produced, draw-textured and tested for dyeability, using the same procedures and reference standard used above for the partially-oriented yarn. Fully-drawn texturing feed yarns are also prepared, textured and tested for dyeability using the same procedures and reference standard used above for the fully-drawn yarn.

The polymerization and spinning system described above is operated continuously for a 2½ day period with 3.0 weight percent of diethylene glycol being added to the feed glycol. During this period the amount of catalyst added is varied so that the manganese content in the polymer ranges from 135 ppm to 140 ppm, the antimony content of the polymer varies from 237 ppm to 378 ppm and the phosphoric acid content of the polymer varies from 153 ppm to 257 ppm. The polymer produced is repeatedly analyzed for aliphatic ether content and ethers are found to remain relatively constant at 2.97 ± 0.21 mole percent, a 1.9 mole % increase vs. the original ether content. Draw-texturing feed yarn spun from the polymer is found to maintain a percent dyeability of 120 ± 2. Fully-drawn texturing feed yarn spun from the polymer is found to maintain a percent dyeability of 123 ± 4 percent.

No deleterious effects of the diethylene glycol addition were noted. Both feed and textured yarn properties were found to be acceptable.

EXAMPLE 2

A continuous polymerization unit for preparing polyethylene terephthalate polymer from dimethyl terephthalate and ethylene glycol is operated at 93.3 percent of capacity and the polymer produced fed to a spinning machine where a 245-denier, 34-filament partially oriented texturing feed yarn is produced. The dyeability level is determined to be satisfactory. Then the throughput of the polymerization system is raised to 99.4 percent of capacity and a 2-3 percent loss in dyeability normally expected for such an increase in throughput is observed. To correct this, 0.3 mole percent (calculated on polymer) of diethylene glycol is added to the ethylene glycol feed system. The texturing feed yarn produced with added DEG is found to have substantially the same dyeability as that exhibited by the yarn made before the throughput change. No merge change is required.

EXAMPLE 3

This example illustrates the improvement in uniformity of dyeability provided by the present invention.

A continuous polymerization system for preparing polyethylene terephthalate from dimethyl terephthalate and ethylene glycol is operated at full capacity and the polymer produced fed to a spinning machine. The polymer produced is spun into a 34-filament partially-oriented draw-texturing feed yarn of 235 denier. Sufficient diethylene glycol is added to the glycol feed system to raise the ether level in the polymer by 1.2 mole percent, giving a total ether content of 2.1 mole percent. With the polymerization equipment operating under steady state conditions, several packages of partially oriented feed yarn are collected and draw textured under identical conditions on an ARCT-480 texturing machine. The textured yarns are then knit into panels, dyed at atmospheric pressure as in Example 1 and the dye level measured on a reflectance meter.

For comparison, the same system is operated without the addition of diethylene glycol but with all other conditions being the same. Ether content of the polymer is found to be 0.9 mole percent. The yarn produced is textured under the same conditions and on the same texturing machine as the yarn containing the higher ether content, and the textured yarn is knit, dyed and tested for dyeability level as before.

In comparing the uniformity of dye uptake of the two yarns tested, it is found that the textured yarn prepared from polymer to which diethylene glycol has been added gives, in four replicate tests, dye variances of 15.8, 17.3, 12.1 and 17.5. In contrast, the textured yarn prepared from polymer to which no diethylene glycol has been added is found, in three replicate tests, to give dye variances of 41.5, 51.8 and 40.3. These data indicate that the addition of diethylene glycol to the polymer gives a much improved uniformity of dye-ability.

We claim:

1. An improvement in a continuous process for producing polyester texturing feed yarn from ethylene glycol and dimethyl terephthalate or terephthalic acid in which a polymer of less than 3 mole percent ether content is prepared and melt-spun to form partially oriented yarn or fully drawn yarn, wherein the improvement comprises adding diethylene glycol to increase the ether content of the polymer by an amount within the range of 0.1 to 2 mole percent to correct for non-uniformity in dyeability of products prepared from the feed yarn.

2. A process as defined in claim 1 wherein dyeability of products prepared from the feed yarn is determined periodically and the amount of diethylene glycol added is adjusted to maintain a substantially uniform dyeability.

3. A process as defined in claim 1 wherein diethylene glycol is added to increase the ether content of the polymer by 1 to 2 mole percent and the total ether content of the polymer is maintained between 2 and 4 mole percent.

4. A process as defined in claim 1 wherein the total ether content of the polymer is maintained below 3 mole percent.

* * * * *